United States Patent
Perumal et al.

(10) Patent No.: US 12,541,214 B2
(45) Date of Patent: Feb. 3, 2026

(54) PRESSURE SENSING AND REGULATING SYSTEM

(71) Applicant: ENTEGRIS, INC., Billerica, MA (US)

(72) Inventors: Thines Kumar Perumal, Singapore (SG); Aravind Vasanthakumar, Singapore (SG); Subhash Guddati, Singapore (SG); Montray Leavy, Singapore (SG); Sanado Barolli, Bethlehem, CT (US); Edward E. Jones, Woodbury, CT (US)

(73) Assignee: ENTEGRIS, INC., Billerica, MA (US)

( * ) Notice: Subject to any disclaimer, the term of this patent is extended or adjusted under 35 U.S.C. 154(b) by 78 days.

(21) Appl. No.: 18/132,763

(22) Filed: Apr. 10, 2023

(65) Prior Publication Data
US 2023/0324933 A1   Oct. 12, 2023

Related U.S. Application Data

(60) Provisional application No. 63/329,591, filed on Apr. 11, 2022.

(51) Int. Cl.
| | | |
|---|---|---|
| G05D 16/16 | (2006.01) | |
| G05D 7/06 | (2006.01) | |
| G05D 16/10 | (2006.01) | |

(52) U.S. Cl.
CPC ......... *G05D 16/163* (2013.01); *G05D 16/103* (2013.01); *F17C 2205/0338* (2013.01); *G05D 7/0635* (2013.01); *Y10T 137/7761* (2015.04)

(58) Field of Classification Search
CPC .................................. Y10T 137/7761
See application file for complete search history.

(56) References Cited

U.S. PATENT DOCUMENTS

| | | | | |
|---|---|---|---|---|
| 5,988,210 | A | * 11/1999 | Komiya | G01F 1/36 137/486 |
| 6,302,130 | B1 | * 10/2001 | Ohmi | G05D 7/0635 137/557 |
| 2003/0226588 | A1 | 12/2003 | Olander | |
| 2007/0191989 | A1 | * 8/2007 | Esposito | G05B 19/0425 700/282 |
| 2015/0107679 | A1 | * 4/2015 | Downie | G05D 11/137 137/7 |
| 2015/0247605 | A1 | 9/2015 | Despres | |
| 2016/0172164 | A1 | * 6/2016 | Sweeney | H01J 37/3171 250/429 |
| 2019/0078696 | A1 | 3/2019 | Tom | |

FOREIGN PATENT DOCUMENTS

| | | |
|---|---|---|
| EP | 1139007 B1 | 7/2003 |
| JP | 1163398 A | 3/1999 |

\* cited by examiner

*Primary Examiner* — Robert K Arundale

(57) ABSTRACT

A high pressure fluid storage device with a pressure sensing and regulating system configured for delivery of vaporized solid and liquid precursor materials at a regulated pressure range. At least some components of the pressure regulating system is contained internally within the storage device.

15 Claims, 4 Drawing Sheets

PRESSURE SENSING AND REGULATING SYSTEM

FIELD

The present disclosure relates to the field of vacuum actuated cylinders (VACs) and subatmospheric pressure gas delivery systems with pressure regulated valves.

BACKGROUND

Subatmospheric pressure delivery systems, such as VACs, can use a pressure sensing assembly (PSA) of components to regulate opening and closing of valves. These PSA generally include various mechanical components that are assembled with a bellows structure component, a poppet valve component, and a coil spring assembled together. These assembly of mechanical components are not configured to control or regulate fluctuation of gases at the ultimate delivery line of the gases, and PSAs can lead to pressure spikes at the ultimate delivery line of the gases.

SUMMARY

Some of the embodiments disclosed herein are directed towards systems and methods for regulating the delivery pressure to a delivery line, so that the delivery pressure of a gas is constant (or substantially not changing) and stable.

Accordingly, some of the embodiments disclosed herein are directed towards systems and methods for regulating the delivery pressure to a delivery line, so that the delivery pressure of a gas is without pressure spikes (which are generally a characteristic of unregulated mass gas flow).

In some embodiments, a fluid supply system comprises a container body which defines an internal cavity for storing a fluid at a first pressure and a pressure regulator system comprising various components and/or devices, wherein at least some of the pressure regulator system is disposed in the internal cavity.

In some embodiments, the pressure regulator system is configured to take the fluid having the first pressure, which enters the regulator system via a main inlet, and direct a flow of the fluid to the outlet at a second pressure, wherein the second pressure is lower than the first pressure. In some embodiments, the first pressure is a compressed pressure such that the compressed pressure is higher or equal to the atmospheric pressure. In some embodiments, the second pressure is subatmospheric pressure.

In some embodiments, a system is configured for flowing a fluid contained within a container to a delivery line, wherein the fluid contained within the container is compressed at a first pressure and the fluid flowing to the delivery line is at a second pressure, the second pressure being subatmospheric pressure, the system comprising an electromechanical valve, wherein the electromechanical valve includes a fluid-in portion and a fluid-out portion, and the electromechanical valve has a variable open state ranging from fully closed to fully open, wherein the variable open state is controlled by a variable control electric signal; and a pressure sensor, wherein the fluid-out portion has a control loop flow portion which directs at least a part of the fluid flow to the pressure sensor, wherein the pressure sensor detects a local pressure of the fluid, and based on the detection of the local pressure, the pressure sensor is configured to generate and send the variable control electric signal (e.g., an output voltage or current) to the electromechanical valve to control the variable open state of the electromechanical valve.

In some embodiments of the system, the pressure sensor includes a pressure-sensitive component configured to move or flex based on the local pressure.

In some embodiments of the system, the pressure sensor comprises a piezoelectric crystal, and the pressure-sensitive component is connected to the piezoelectric crystal such that movement or flexing of the pressure-sensitive component causes compression on the piezoelectric crystal to generate the variable control electric signal.

In some embodiments of the system, the pressure-sensitive component includes a flexible membrane.

In some embodiments of the system, the electromechanical valve is upstream of the pressure sensor.

In some embodiments, the system further comprises a second electromechanical valve, wherein the second electromechanical valve includes a second fluid-in portion and a second fluid-out portion, and the second electromechanical valve has a second variable open state ranging from fully closed to fully open, wherein the second variable open state is controlled by a second variable control electric signal; and a second pressure sensor, wherein the second fluid-out portion has a second control loop flow portion which directs at least a part of the fluid flow to the second pressure sensor, wherein the second pressure sensor detects a second local pressure of the fluid, and based on the detection of the second local pressure, the second pressure sensor is configured to generate and send the second variable control electric signal to the second electromechanical valve to control the second variable open state of the second electromechanical valve.

In some embodiments of the system, the electromechanical valve is upstream of the second electromechanical valve.

In some embodiments of the system, the pressure sensor is upstream of the second pressure sensor.

In some embodiments of the system, the electromechanical valve and the pressure sensor are both upstream of the second electromechanical valve and the second pressure sensor.

In some embodiments of the system, the fluid-out portion of the electromechanical valve is connected to the second fluid-in portion of the second electromechanical valve.

In some embodiments of the system, the second pressure sensor includes a second pressure-sensitive component configured to move or flex based on the second local pressure.

In some embodiments of the system, the second pressure sensor comprises a second piezoelectric crystal, and the second pressure-sensitive component is connected to the second piezoelectric crystal such that movement or flexing of the second pressure-sensitive component causes compression on the second piezoelectric crystal to generate the second variable control electric signal.

In some embodiments of the system, the second pressure-sensitive component includes a second flexible membrane.

In some embodiments of the system, the second electromechanical valve is upstream of the second pressure sensor.

In some embodiments, the system further comprising a filter connected to and upstream of the fluid-in portion of the electromechanical valve.

In some embodiments, a system is configured for flowing a fluid contained within a container to a delivery line, wherein the fluid contained within the container is compressed at a first pressure and the fluid flowing to the delivery line is at a second pressure, the second pressure being subatmospheric pressure, the system comprising an electromechanical valve, wherein the electromechanical valve includes a fluid-in portion and a fluid-out portion, and the electromechanical valve has a variable open state ranging from fully closed to fully open, wherein the variable open state is controlled by a variable control signal; a first pressure sensor, wherein the first pressure sensor is disposed upstream of the electromechanical valve; a second pressure sensor, wherein the second pressure sensor is disposed downstream of the electromechanical valve; and a gas flow control device, wherein the gas flow control device is in communication with the electromechanical valve, the first pressure sensor, and the second pressure sensor, wherein the gas flow control device comprises a microprocessor and a non-transitory memory with a specialized algorithm for determining and sending the variable control signal for controlling the variable open state of the electromechanical valve based on data received from the first pressure sensor, the second pressure sensor, or both.

In some embodiments, the system further comprises a second electromechanical valve, wherein the second electromechanical valve includes a second fluid-in portion and a second fluid-out portion, the second fluid-in portion is connected to the fluid-out portion of the electromechanical valve, and the second electromechanical valve has a second variable open state ranging from fully closed to fully open, wherein the second variable open state is controlled by a second variable control signal; wherein the gas flow control device is in communication with the second electromechanical valve, wherein the specialized algorithm for the gas flow control device is configured for determining and sending the second variable control signal for controlling the second variable open state of the second electromechanical valve based at least on data received from the first pressure sensor, the second pressure sensor, or both.

In some embodiments, the system further comprises another pressure sensor, wherein the another pressure sensor is disposed downstream of the second electromechanical valve, and wherein the another pressure sensor being in communication with the gas flow control device, wherein the specialized algorithm of the gas flow control device is configured for determining and sending the variable control signal for controlling the variable open state of the electromechanical valve based at least partly on data received from the another pressure sensor, determining and sending the second variable control signal for controlling the second variable open state of the second electromechanical valve based at least partly on data received from the another pressure sensor, or both.

In some embodiments, the system further comprises a delivery pressure sensor, wherein the delivery pressure sensor is disposed downstream of the electromechanical valve, and wherein the delivery pressure sensor is in communication with the gas flow control device; wherein the specialized algorithm of the gas flow control device is configured for determining and sending the variable control signal for controlling the variable open state of the electromechanical valve based at least partly on data received from the delivery pressure sensor, determining and sending the second variable control signal for controlling the second variable open state of the second electromechanical valve based at least partly on data received from the delivery pressure sensor, or both.

In some embodiments, the system further comprises a delivery line pressure sensor, wherein the delivery line pressure sensor is disposed downstream of the electromechanical valve, wherein the delivery line pressure sensor is in communication with the gas flow control device, wherein the specialized algorithm of the gas flow control device is configured for determining and sending the variable control signal for controlling the variable open state of the electromechanical valve based at least partly on data received from the delivery line pressure sensor, determining and sending the second variable control signal for controlling the second variable open state of the second electromechanical valve based at least partly on data received from the delivery line pressure sensor, or both.

In some embodiments, the system further comprises a delivery line pressure sensor, wherein the delivery line pressure sensor is disposed downstream of the electromechanical valve, wherein the delivery line pressure sensor is in communication with the gas flow control device, wherein the specialized algorithm of the gas flow control device is configured for determining and sending the variable control signal for controlling the variable open state of the electromechanical valve based at least partly on data received from the delivery line pressure sensor.

In some embodiments, the system further comprises a delivery pressure sensor, wherein the delivery pressure sensor is disposed downstream of the electromechanical valve, and wherein the delivery pressure sensor is in communication with the gas flow control device; wherein the specialized algorithm of the gas flow control device is configured for determining and sending the variable control signal for controlling the variable open state of the electromechanical valve based at least partly on data received from the delivery pressure sensor.

In some embodiments, a fluid container comprises any one or more of the system described herein.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
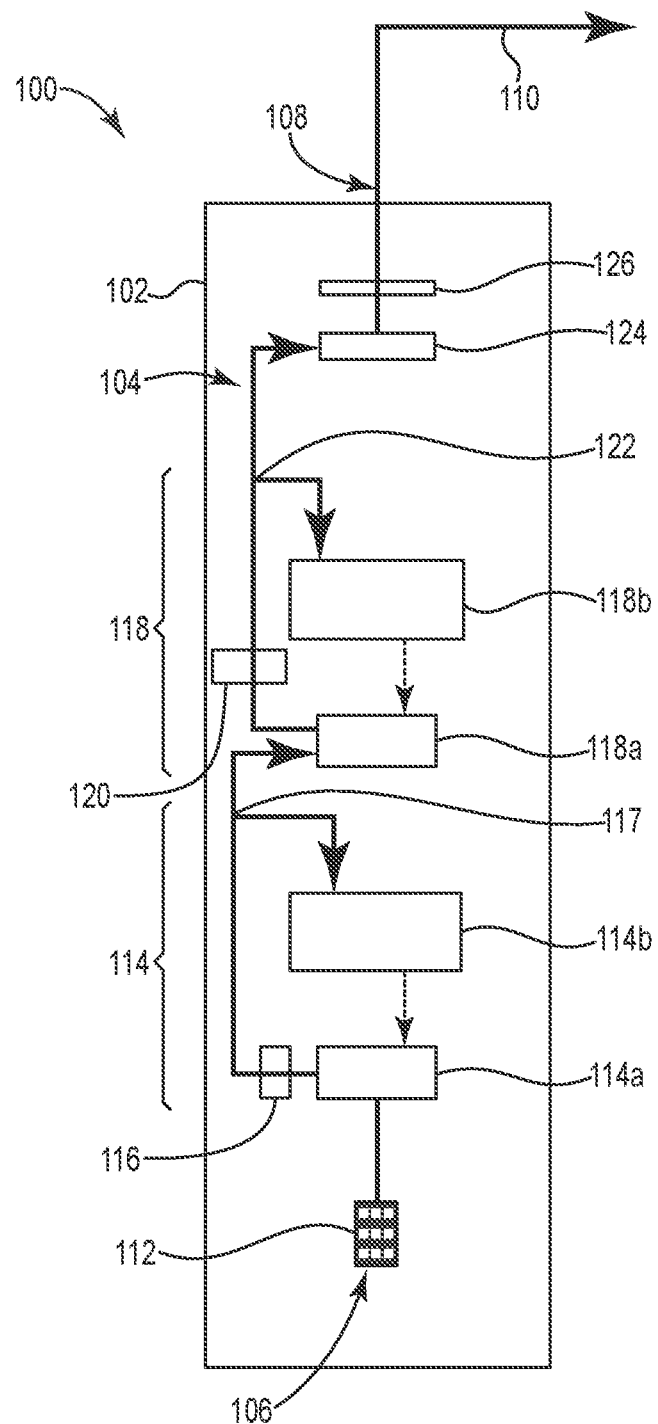
FIG. 1 depicts a schematic diagram of a non-limiting embodiment a subatmospheric pressure delivery system.

FIG. 1 depicts a schematic diagram of a non-limiting embodiment a subatmospheric pressure delivery system 100. The subatmospheric pressure delivery system 100 can include a container 102 which is configured to contain a pressurized fluid (e.g., a gas) such that the pressure of the fluid is at a pressure that is greater than or equal to atmospheric pressure (e.g., 100-1600 psig). In some embodiments, the container 102 is configured to contain the pressurized fluid wherein the pressure of the fluid is at a pressure that is greater than atmospheric pressure. In some embodiments, the container 102 is configured to contain the pressurized fluid wherein the pressure of the fluid is at a pressure that is not lower than atmospheric pressure. In some embodiments, the container 102 is configured to contain the pressurized fluid wherein the pressure of the fluid is at a pressure that is not subatmospheric pressure. In some embodiments, as shown in FIG. 1, the subatmospheric pressure delivery system 100 is contained within the inner volume 104 of the container 102. The subatmospheric pressure delivery system 100 has a main inlet 106 which directs the fluid flow towards an outlet 108, which is connected to a delivery line 110. The subatmospheric pressure delivery system 100 is configured to regulate the pressure of the fluid during the flow of the fluid from the main inlet 106 to the outlet 108 such that the output pressure at the outlet 108 and/or at the delivery line 110 is a substantially constant pressure. That is, at the outlet 108 and/or at the delivery line 110, the fluid does not have substantial spikes of pressure, and this output pressure (i.e., delivery pressure) is subatmospheric pressure. FIG. 1 shows the subatmospheric pressure delivery system 100 including a filter 112 at or near the main inlet 106. Downstream from the filter 112 is a first set of a pressure controlled valve system 114. The pressure controlled valve system 114 includes an electromechanical valve 114a and a pressure sensor 114b. The working of the pressure controlled valve system 114 is described below with reference to FIG. 2. The fluid flow in the subatmospheric pressure delivery system 100 flows through the valve 114a when the valve 114a is open (where the pressure of the fluid flowing through the valve 114a is controlled by the pressure sensor 114b), where the fluid passes through a diffuser 116. The diffuser 116 dampens the flow of fluid and increases the pressure drop of the fluid passing through it.

From the diffuser 116, the fluid flow is directed to a bifurcation section 117, where some of the fluid flow is directed to the pressure sensor 114b, and the rest of the fluid flow is directed to a second pressure controlled valve system 118. The bifurcation section and the second pressure controlled valve system 118 are, in combination, one of several control loops (e.g., control loop flow portion) for the fluid flow of the subatmospheric pressure delivery system 100. In some embodiments, the second pressure controlled valve system 118 is same or substantially similar to the pressure controlled valve system 114. That is, in some embodiments, the pressure controlled valve system 118 includes an electromechanical valve 118a and a pressure sensor 118b, their workings being described below with reference to FIG. 2. The fluid flow in the subatmospheric pressure delivery system 100 flows through the valve 118a when the valve 118a is open (where the pressure of the fluid flowing through the valve 118a is controlled by the pressure sensor 118b), where the fluid passes through another diffuser 120. The fluid flow is directed to another bifurcation section 122, where some of the fluid flow is directed to the pressure sensor 118b, and the rest of the fluid flow is directed to a delivery valve 124. Downstream of the delivery valve 124 is a diffuser 126, and then the fluid flow is directed past the diffuser 126 to the outlet 108, which is connected to the delivery line 110. The diffuser 126 dampens the flow of fluid and increases the pressure drop of the fluid passing through it. The fluid pressure at the outlet 108, at the delivery line 110, or both is subatmospheric and absent pressure spikes (which can be seen in unregulated fluid flow systems).

In some embodiments, the subatmospheric pressure delivery system 100 has multiple electromechanical valves 114a, 118a positioned along the flow path of the fluid. Accordingly, at least one of the electromechanical valves 114a is up upstream of one or more other electromechanical valve(s) 118a.

In some embodiments, the subatmospheric pressure delivery system 100 has multiple pressure sensors 114b, 118b. Accordingly, at least one of the pressure sensors 114b is upstream of one or more other pressure sensor(s) 118b.

In some embodiments, the subatmospheric pressure delivery system 100 has multiple electromechanical valves 114a, 118a and pressure sensors 114b, 118b. Accordingly, at least one set of the electromechanical valves 114a and pressure sensors 114b is upstream of one or more other set(s) of electromechanical valves 118a and pressure sensor(s) 118b.

Figure 2:
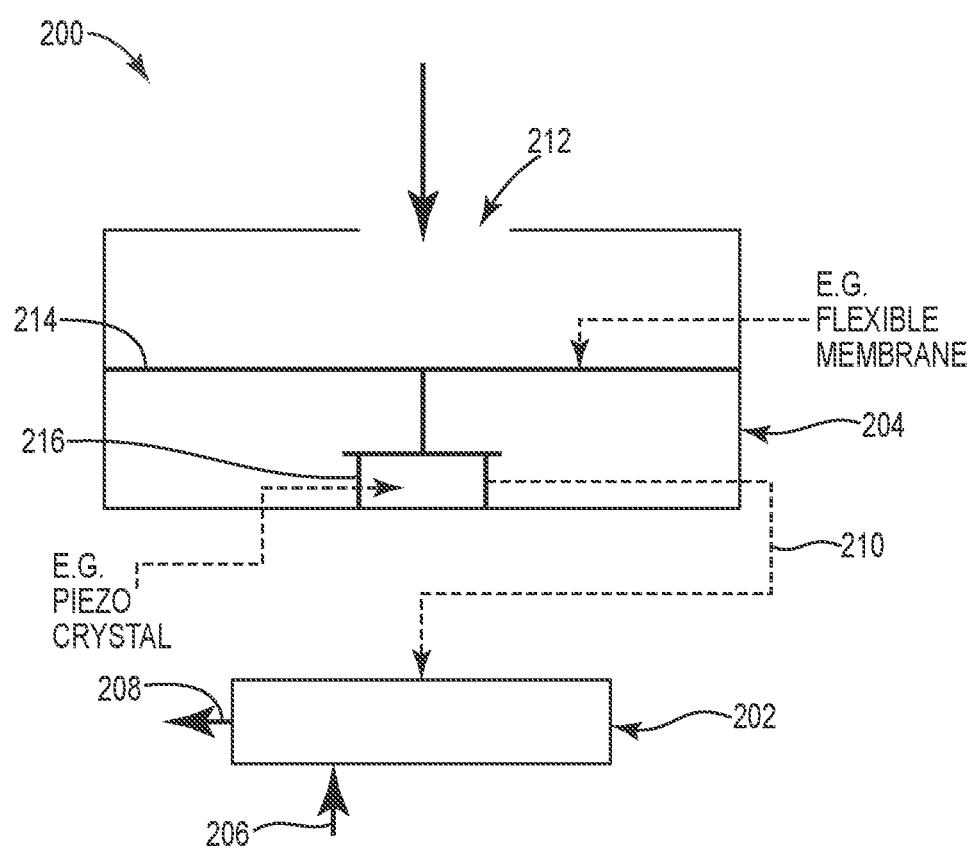
FIG. 2 depicts a schematic diagram of a non-limiting embodiment a pressure sensor and controllable electromechanical valve system.

FIG. 2 depicts a schematic diagram of a non-limiting embodiment an exemplary pressure controlled valve system 200 (which can be the same or similar to 114 and 118 depicted in FIG. 1) for the subatmospheric pressure delivery system (e.g., the subatmospheric pressure delivery system 100 depicted in FIG. 1). This embodiment of the pressure controlled valve system 200 includes an electromechanical valve 202 and a pressure sensor 204. The electromechanical valve 202 has a fluid-in portion 206 and a fluid-out portion 208. Accordingly, the electromechanical valve 202 is configured to control a fluid flow therethrough via an open or close operation. In some embodiments, the electromechanical valve 202 is configured to have a variable open state ranging from fully closed to fully open. That is, the electromechanical valve 202 can be partially open in a varying degree in such a manner to control an amount of fluid flowing therethrough, and this configuration allows for a control of a fluid pressure for the fluid flowing through and past the electromechanical valve 202. The variable open state of the electromechanical valve 202 is controlled by a variable control signal 210 (e.g., a variable control electric signal which can be or include, for example, an output voltage or current), from the pressure sensor 204.

According to some embodiments, the pressure sensor 204 has a body with an inlet port 212 which allows for the fluid to contact one side of a pressure-sensitive component 214 (e.g., a flexible membrane) configured to move or flex based on the local pressure due to the fluid on the one side. The pressure-sensitive component 214 is connected to a component 216 which can generate the variable control signal 210. In some embodiments, the component 216 includes or is a piezoelectric crystal which is electrically connected to the electromechanical valve 202. The piezoelectric crystal is compressed or decompressed by the movement or flexing of the pressure-sensitive component 214, and this compression or decompression can turn on, off, or vary the electric control signal that is sent to the electromechanical valve 202.

Figure 3:
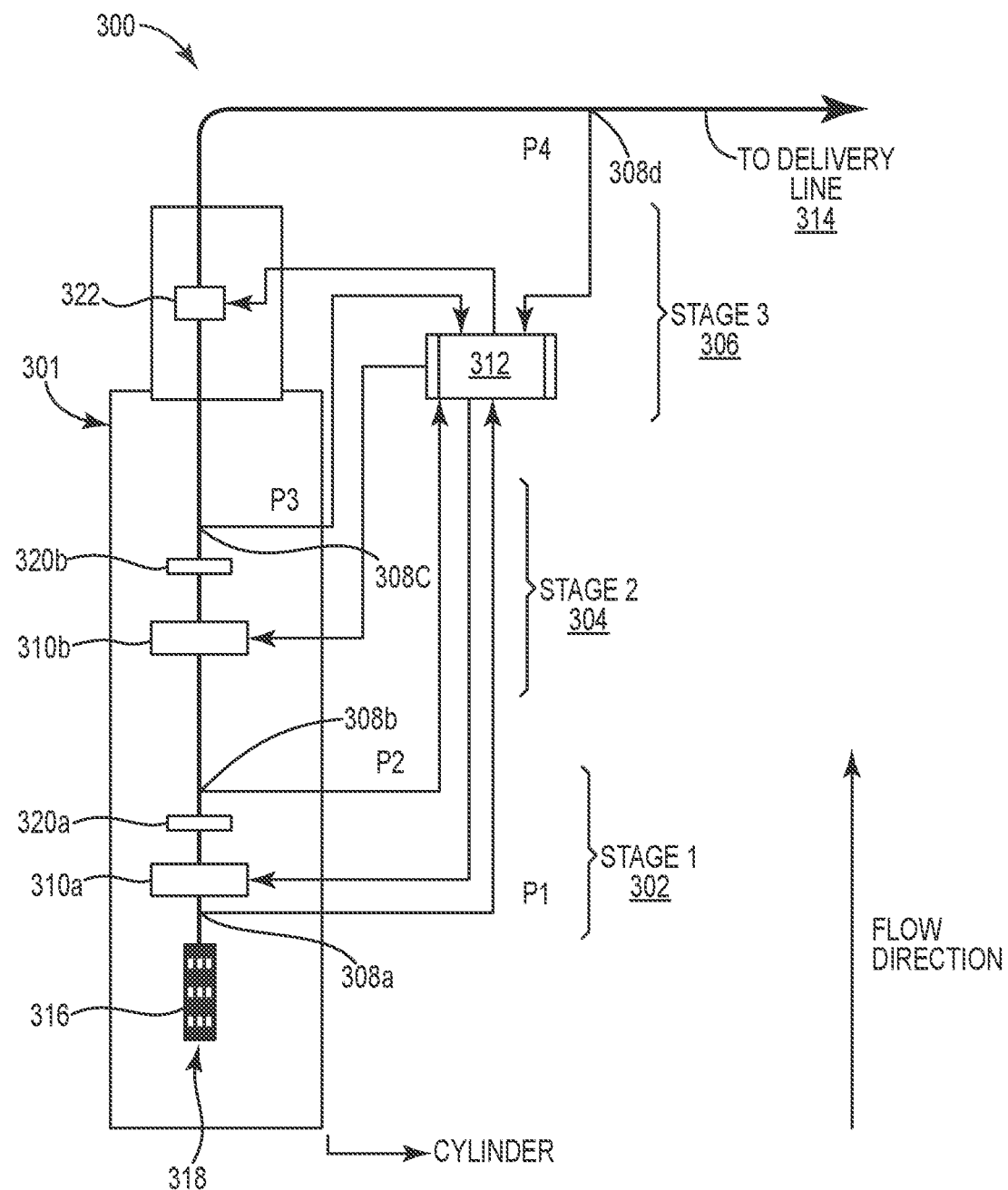
FIG. 3 depicts a schematic diagram of a non-limiting embodiment a subatmospheric pressure delivery system.

FIG. 3 depicts a schematic diagram of a non-limiting embodiment a subatmospheric pressure delivery system 300. The subatmospheric pressure delivery system 300 can include a container 301 which is configured to contain a pressurized fluid (e.g., a gas) such that the pressure of the fluid is at a pressure that is greater than or equal to atmospheric pressure (e.g., 100-1600 psig). In some embodiments, the container 301 is configured to contain the pressurized fluid wherein the pressure of the fluid is at a pressure that is greater than atmospheric pressure. In some embodiments, the container 301 is configured to contain the pressurized fluid wherein the pressure of the fluid is at a pressure that is not lower than atmospheric pressure. In some embodiments, the container 301 is configured to contain the pressurized fluid wherein the pressure of the fluid is at a pressure that is not subatmospheric pressure.

The subatmospheric pressure delivery system 300 depicted in FIG. 3 has multiple stages 302, 304, 306, wherein each stage 302, 304, 306 includes at least one sensor 308a, 308b, 308c and at least one controlled electromechanical valve 310a, 310b. Each of the sensors 308a-c senses the pressures P1, P2, P3 at different portions of the fluid line, and communicates these pressures P1, P2, P3 to a gas flow control device 312. Thus, in the subatmospheric pressure delivery system 300 depicted in FIG. 3, there are three stages 302, 304, 306 for reducing the fluid pressure to ultimately achieve a subatmospheric delivery pressure P4 at the delivery line 314. At each of the three stages 302, 304, 306 a feedback loop control is applied by the gas flow control device 312. In some embodiments, the gas flow control device 312 is contained within the container along with the subatmospheric pressure delivery system 300. In some embodiments, the gas flow control device 312 is not contained within the container along with the subatmospheric pressure delivery system 300. In some embodiments, the gas flow control device 312 is disposed outside of the container along with the subatmospheric pressure delivery system 300. In some embodiments, the gas flow control device 312 is disposed not outside of the container along with the subatmospheric pressure delivery system 300.

In some embodiments, the subatmospheric pressure delivery system 300 includes a filter 316 at or near the main inlet 318. Downstream from the filter 316 is a first controlled valve 310a. Upstream of the controlled valve 310a is a pressure sensor 308a for detecting and measuring pressure P1. The fluid flow in the subatmospheric pressure delivery system 300 flows through the valve 310a when the valve 310a is open (where the variable open state of the valve 310a is controlled by the gas flow control device 312). Downstream of the valve 310a is a porous membrane 320a, and the fluid passes through the membrane 320a where the flow of the fluid is dampened, and this increases the pressure drop of the fluid passing through it.

The fluid flow passes another pressure sensor 308b for detecting and measuring pressure P2. Then another controlled valve 310b when the valve 310b is open. The variable open state of the valve 310b is controlled by the gas flow control device 312. Another porous membrane 320b is located downstream of the valve 310b, and as the fluid passes through the membrane 320b the flow of the fluid is dampened, and this increases the pressure drop of the fluid passing through it. Downstream of the membrane 320b, there is another pressure sensor 308c for detecting and measuring pressure P3. Downstream of the pressure sensor 308c, there is a delivery valve 322 which is also controlled by the gas flow control device 312. And at the delivery line, there is another pressure sensor 308d for detecting and measuring a delivery pressure P4 at the delivery line 314.

In some embodiments, the gas flow control device 312 comprises a microprocessor and a non-transitory memory with a specialized algorithm for determining and sending at least one variable control signal for controlling a variable open state of an electromechanical valve based on data (e.g., pressure) received from at least one pressure sensor. For example, according to an embodiment and using FIG. 3 as a reference, the following pressures can be detected and measured by various pressure sensors and communicated to the gas flow control device 312:

P1—Pressure sensed upstream of valve 310a (usually at high pressure)
P2—Pressure sensed downstream of porous membrane 320a
P3—Pressure sensed downstream of porous membrane 320b
P4—Delivery pressure At the first stage 302, the gas flow control device 312 is configured to determine the pressure drop by comparing P1 and P2 (e.g., Pressure Drop=P1−P2). Base on this difference (e.g., there is a pressure drop from P1 to P2), the gas flow control device 312 can control the variable open state of the valve 310a to open.

At the second stage 304, the gas flow control device 312 is configured to determine the pressure drop by comparing P2 and P3 (e.g., Pressure drop=P2−P3). Base on this difference (e.g., there is a pressure drop from P2 to P3), the gas flow control device 312 can control the variable open state of the valve 310b to open.

At the third stage 306, the gas flow control device 312 is configured to determine the pressure drop by comparing P3 and P4 (e.g., Pressure drop=P3−P4). Base on this difference (e.g., there is a pressure drop from P3 to P4), the gas flow control device 312 can control the variable open state of the delivery valve 322 to open, but even when there is a pressure drop from P3 to P4, if P4 is not subatmospheric, then the gas flow control device 312 does not open the delivery valve 322 (i.e., the delivery valve 322 remains shut). Only when there is a pressure drop from P3 to P4 and P4 is subatmospheric, the gas flow control device 312 controls the delivery valve 322 to open.

According to some embodiments, the gas flow control device 312 has additional processes to determine the pressure drops and other expected pressure values based on the following relationships (which can be applied to determine errors in the sensors or the system's operation).

P2=P1—first stage pressure drop
P3=P2—second stage pressure drop
P4=P3—third stage pressure drop
P4=P1—first stage pressure drop—second stage pressure drop—third stage pressure drop Although not shown in FIG. 3, in some embodiments, the subatmospheric pressure delivery system 300 can also include additional pressure sensors and/or other sensors that are in communication with the gas flow control device 312. For example, the subatmospheric pressure delivery system 300 can include a delivery pressure sensor for detecting and measuring the delivery pressure wherein the delivery pressure sensor is disposed downstream of one or more electromechanical valve(s).

Further, in some embodiments, the subatmospheric pressure delivery system 300 can be configured to be inoperable when it is not powered (e.g., via a power sensor or trigger). This can enhance the safe operation of the subatmospheric pressure delivery system 300.

According to some embodiments, the gas flow control device 312 can control the variable open states of one or more valves as well as the rates of the opening and/or rates of the closing of the valves.

Figure 4:
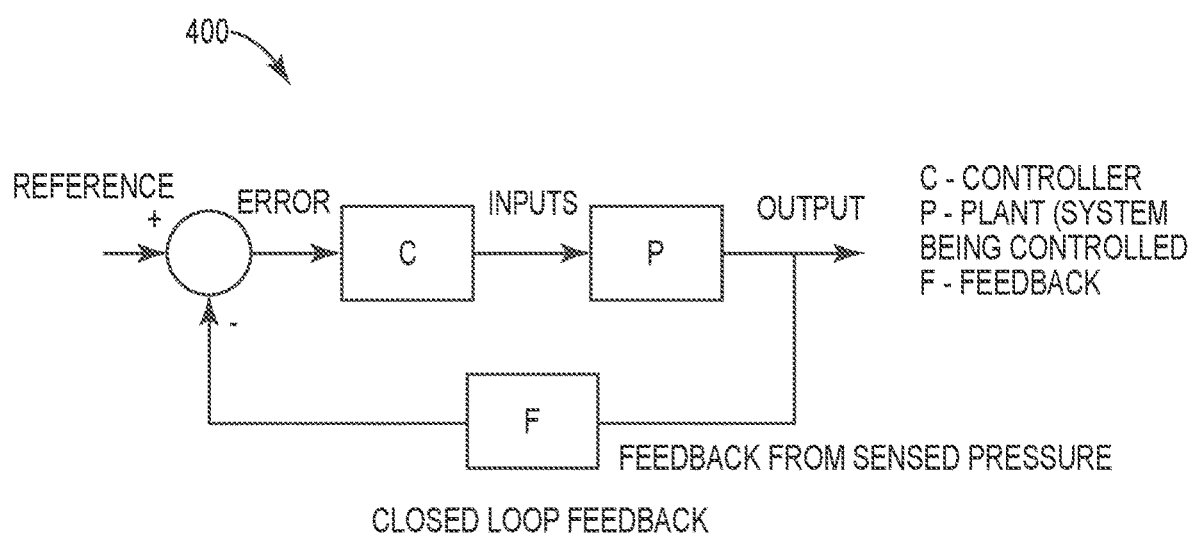
FIG. 4 depicts a schematic flow chart of a non-limiting embodiment a closed loop feedback process for a subatmospheric pressure delivery system.

FIG. 4 depicts a schematic flow chart of a non-limiting embodiment a closed loop feedback process 400 for a subatmospheric pressure delivery system. FIG. 4 shows a negative feedback system, which minimizes error between the desired output and input. This feedback loop process 400 can be applied by the gas flow control device 312 at each or at least one of the stages 302, 304, 306. The detected pressures P1, P2, P3 at each stage 302, 304, 306 is compared with a reference for that stage by the gas flow control device 312. At the gas flow control device 312, errors are corrected, and the gas flow control device 312 can operate each of the valves 310a, 310b, 310c precisely to achieve the desired subatmospheric pressure without pressure spikes.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A system for flowing a fluid contained within a container to a delivery line, wherein the fluid contained within the container is compressed at a first pressure and the fluid flowing to the delivery line is at a second pressure, the second pressure being subatmospheric pressure, the system comprising:
    a first electromechanical valve,
        wherein the first electromechanical valve includes a fluid-in portion and a fluid-out portion, and the electromechanical valve has a variable open state ranging from fully closed to fully open, wherein the variable open state is controlled by a variable control electric signal;
    a second electromechanical valve located downstream of the first electromechanical valve,
        wherein the second electromechanical valve includes a fluid-in portion and a fluid-out portion, and the second electromechanical valve has a variable open state ranging from fully closed to fully open, wherein the variable open state is controlled by a variable control electric signal;
    a pressure sensor and
    a diffuser downstream of the pressure sensor wherein fluid flows from the pressure sensor and passes through the diffuser,
        wherein the fluid-out portion of the first electromechanical valve has a bifurcated control loop flow portion which directs a first part of the fluid flow to the pressure sensor an a second part of the fluid flow to the fluid-in portion of the second electromechanical valve, wherein the pressure sensor detects a local pressure of the fluid received from the fluid-out portion of the first electromechanical valve, and based on the detection of the local pressure, the pressure sensor is configured to generate and send the variable control electric signal to the first electromechanical valve to control the variable open state of the first electromechanical valve.

2. The system of claim 1, wherein the pressure sensor includes a pressure-sensitive component configured to move or flex based on the local pressure.

3. The system of claim 2, wherein the pressure sensor comprises a piezoelectric crystal, and the pressure-sensitive component is connected to the piezoelectric crystal such that movement or flexing of the pressure-sensitive component causes compression on the piezoelectric crystal to generate the variable control electric signal.

4. The system of claim 2, wherein the pressure-sensitive component includes a flexible membrane.

5. The system of claim 1, wherein the electromechanical valve is upstream of the pressure sensor.

6. The system of claim 1, further comprising [
    a second pressure sensor,
        wherein the fluid-out portion of the second electromechanical valve has a bifurcated control loop flow portion which directs at least a part of the fluid flow to the second pressure sensor, wherein the second pressure sensor detects a local pressure of the fluid received from the fluid-out portion of the second electromechanical valve, and based on the detection of the local pressure, the second pressure sensor is configured to generate and send the variable control electric signal to the second electromechanical valve to control the variable open state of the second electromechanical valve.

7. The system of claim 6, wherein the pressure sensor is upstream of the second pressure sensor.

8. The system of claim 6, wherein the first electromechanical valve and the pressure sensor are both upstream of the second electromechanical valve and the second pressure sensor.

9. The system of claim 8, wherein the fluid-out portion of the first electromechanical valve is connected to the fluid-in portion of the second electromechanical valve.

10. The system of claim 6, wherein the second pressure sensor includes a second pressure-sensitive component configured to move or flex based on the local pressure.

11. The system of claim 10, wherein the second pressure sensor comprises a second piezoelectric crystal, and the second pressure-sensitive component is connected to the second piezoelectric crystal such that movement or flexing of the second pressure-sensitive component causes compression on the second piezoelectric crystal to generate the second variable control electric signal.

12. The system of claim 6, wherein the second pressure-sensitive component includes a second flexible membrane.

13. The system of claim 6, wherein the second electromechanical valve is upstream of the second pressure sensor.

14. The system of claim 1, further comprising a filter connected to and upstream of the fluid-in portion of the electromechanical valve.

15. A fluid container comprising the system of claim 1.

* * * * *